[19] United States Patent
Chen

[11] Patent Number: 6,011,495
[45] Date of Patent: *Jan. 4, 2000

[54] MULTIMEDIA KEYBOARD STRUCTURE

[75] Inventor: Rich Chen, Taipei, Taiwan

[73] Assignee: Silitek Corporation, Taipei, Taiwan

[*] Notice: This patent issued on a continued prosecution application filed under 37 CFR 1.53(d), and is subject to the twenty year patent term provisions of 35 U.S.C. 154(a)(2).

[21] Appl. No.: 08/833,053

[22] Filed: Apr. 3, 1997

[51] Int. Cl.[7] ................................... H03K 17/94
[52] U.S. Cl. .................. 341/22; 341/26; 345/172; 400/472
[58] Field of Search .................. 341/22, 20, 176, 341/26; 345/168, 172, 115, 302; 364/189, 709.12; 400/472, 477, 489

[56] References Cited

U.S. PATENT DOCUMENTS

| | | | |
|---|---|---|---|
| D. 363,928 | 11/1995 | Martin | D14/100 |
| D. 369,594 | 5/1996 | Vossoughi | D14/100 |
| 4,853,888 | 8/1989 | Lata et al. | 345/172 |
| 4,931,950 | 6/1990 | Isle et al. | 345/302 |
| 5,339,095 | 8/1994 | Redford | 345/158 |
| 5,600,313 | 2/1997 | Freedman | 400/489 |
| 5,606,344 | 2/1997 | Blaskey et al. | 345/115 |
| 5,640,540 | 6/1997 | Ansberry et al. | 345/302 |
| 5,675,390 | 10/1997 | Schindler et al. | 395/132 |
| 5,677,687 | 10/1997 | Valdenaire | 341/26 |
| 5,682,525 | 10/1997 | Bouve et al. | 395/329 |

*Primary Examiner*—Michael Horabik
*Assistant Examiner*—Timothy Edwards, Jr.
*Attorney, Agent, or Firm*—Rosenberg, Klein & Lee

[57] ABSTRACT

A multimedia keyboard structure which includes a standard keyboard having a control key pad having a set of keys for cursor, number, screen scroll and multimedia function controls. The control key pad is connected to the scan matrix formed by the I/O lines of the microprocessor of the internal circuit structure of the keyboard. The scan code of Num Lock or Scroll Lock is adapted to match Win 95's register in testing the flag bit of Num Lock or Scroll Lock and judging its flag bit through a driver so that the job of code converting can be executed. The operator is allowed to directly control the control key pad and to monitor the operation through a display screen to which the standard keyboard is connected by means of employing the function provided by WindExec O of Windows API to the path of the file and the file index of the application program.

1 Claim, 4 Drawing Sheets

MULTIMEDIA KEYBOARD STRUCTURE

BACKGROUND OF THE INVENTION

The present invention relates to a multimedia keyboard structure, and more particularly to such a multimedia keyboard structure which combines a set of multimedia function control keys into the key pad of a standard keyboard.

A standard keyboard, as shown in FIG. 3, can be added with additional Hot Keys such as multimedia function control keys (including Volume Up, Volume Dn, Mute, WWW, Record, Rewind, Close, . . . etc., about 17 keys), allowing the Scan Code of each of these Hot Keys to match with the running of an application program of Win 95, so that the operator can directly operate these Hot Keys and monitor the operation through the display screen. If more Hot Keys are to be installed, the size of the keyboard must be increased, and the manufacturing cost of the keyboard will be greatly increased. Referring to FIG. 4, a standard keyboard includes two sets of number keys (1, 2, 3, etc.) and two sets of cursor control keys (Insert, Delete, Home, End, ↑, ↓, ←, →, etc.) that are designed to fit XT grade microprocessor. However, a microprocessor of AT 486 or 586 grade can be controlled through one set of number keys and one set of cursor control keys, and the key pad at the right side is rarely used.

SUMMARY OF THE INVENTION

The present invention has been accomplished in view of the above circumstances. It is the main object of the present invention to provide a keyboard structure which directly utilizes Scroll Lock or Num Lock to match with the running of the application program Win 95 so that they can operate a multimedia function control mode through the keys of a standard keyboard. According to one embodiment of the present invention, the multimedia keyboard structure comprises a standard keyboard having a control key pad consisting of a set of keys for cursor, number, screen scroll and multimedia function controls, where the control key pad is connected to the scan matrix formed by the I/O lines of the microprocessor of the internal circuit structure of the keyboard, and the scan code of Num Lock or Scroll Lock is adapted to match Win 95's register in testing the flag bit of Num Lock or Scroll Lock and judging its flag bit through a driver, so that the job of code converting can be executed, and the operator is allowed to directly control the control key pad, and to monitor the operation through a display screen to which the standard keyboard is connected by means of employing the function provided by WindExec O of Windows API to the path of the file and the file index of the application program.

DETAILED DESCRIPTION OF THE PREFERRED EMBODIMENT

Figure 1:
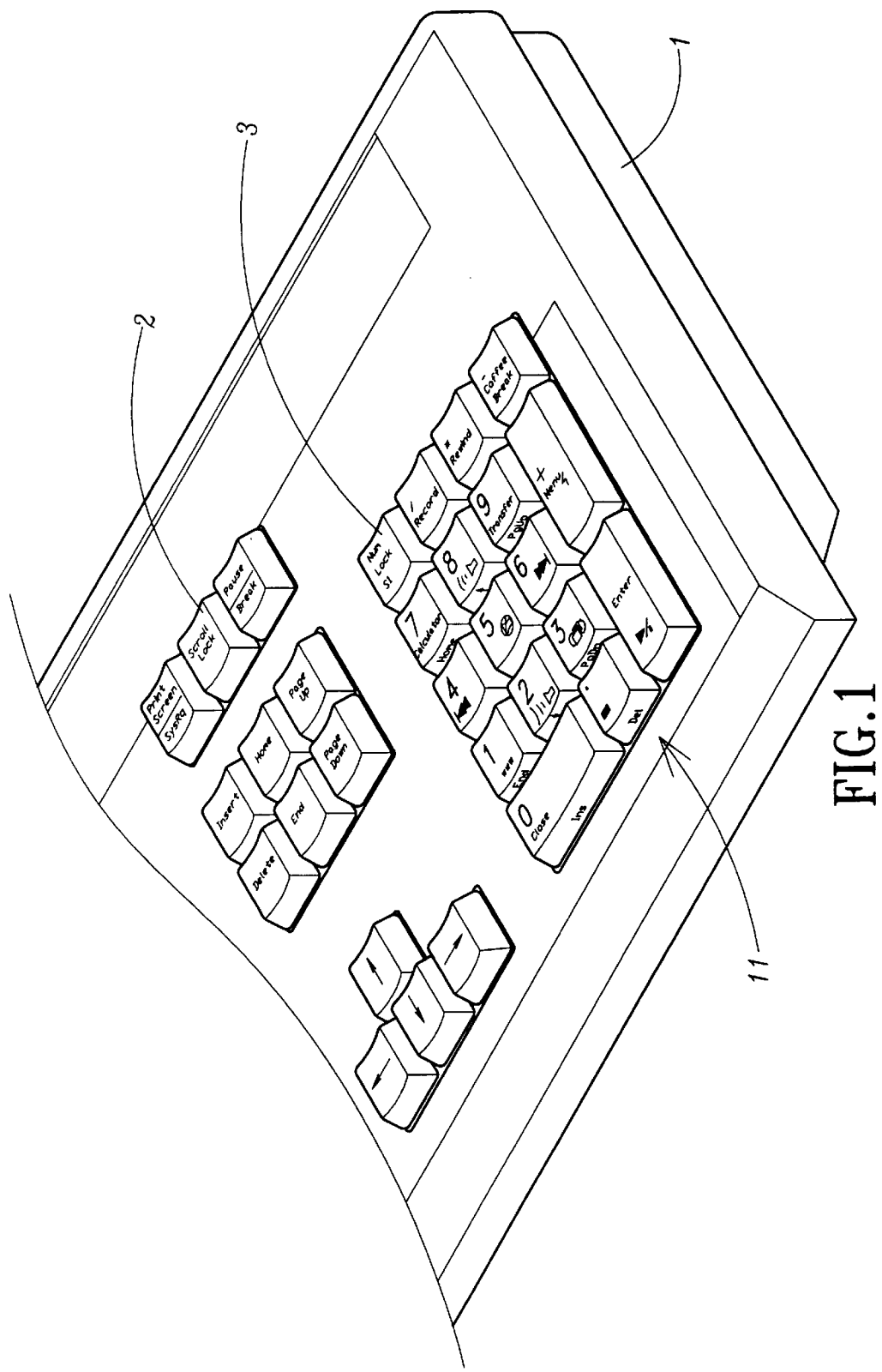
FIG. 1 shows a multimedia keyboard structure according to the present invention.
Figure 2:
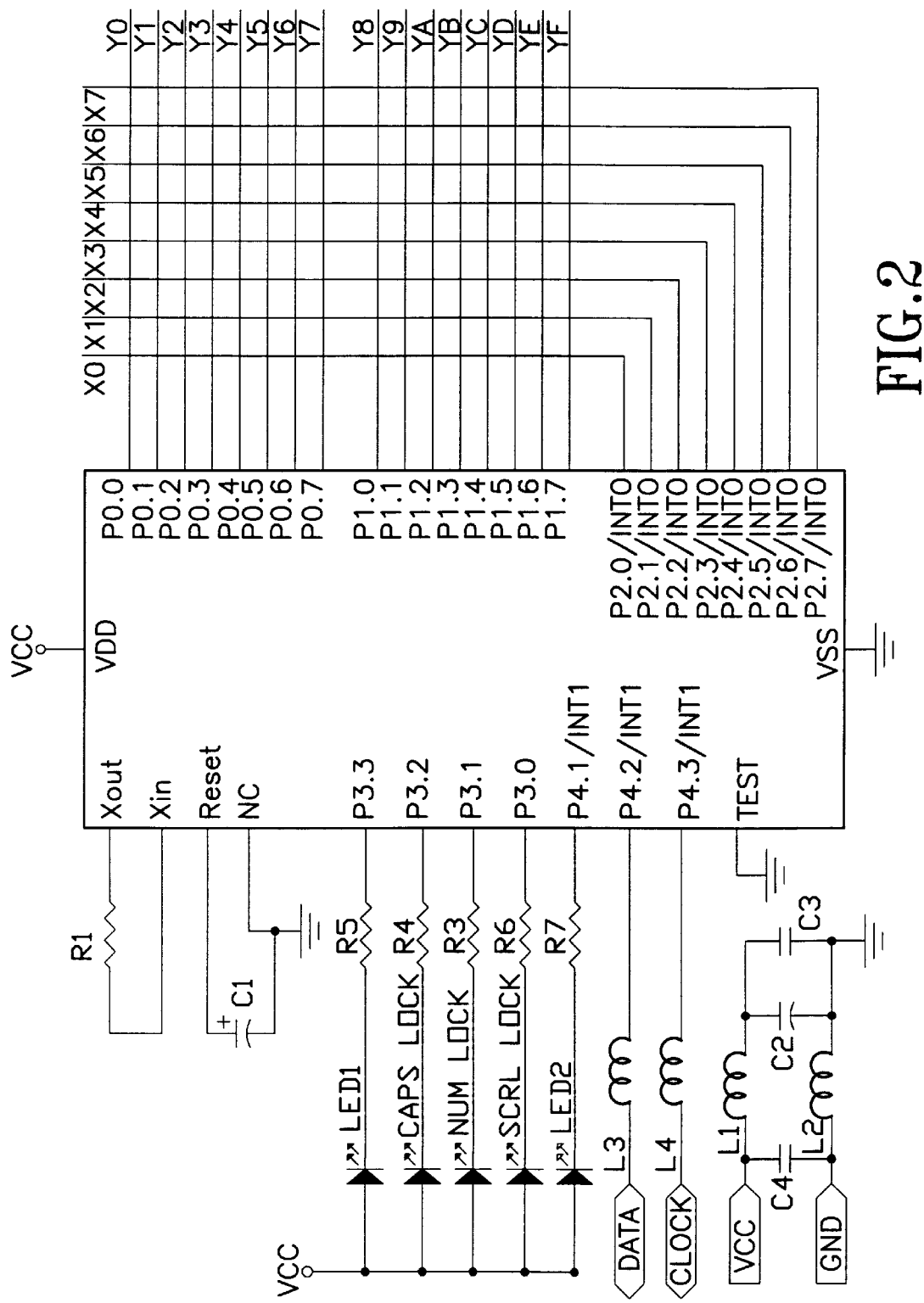
FIG. 2 is a circuit diagram of the multimedia keyboard structure shown in FIG. 1.
Figure 3:
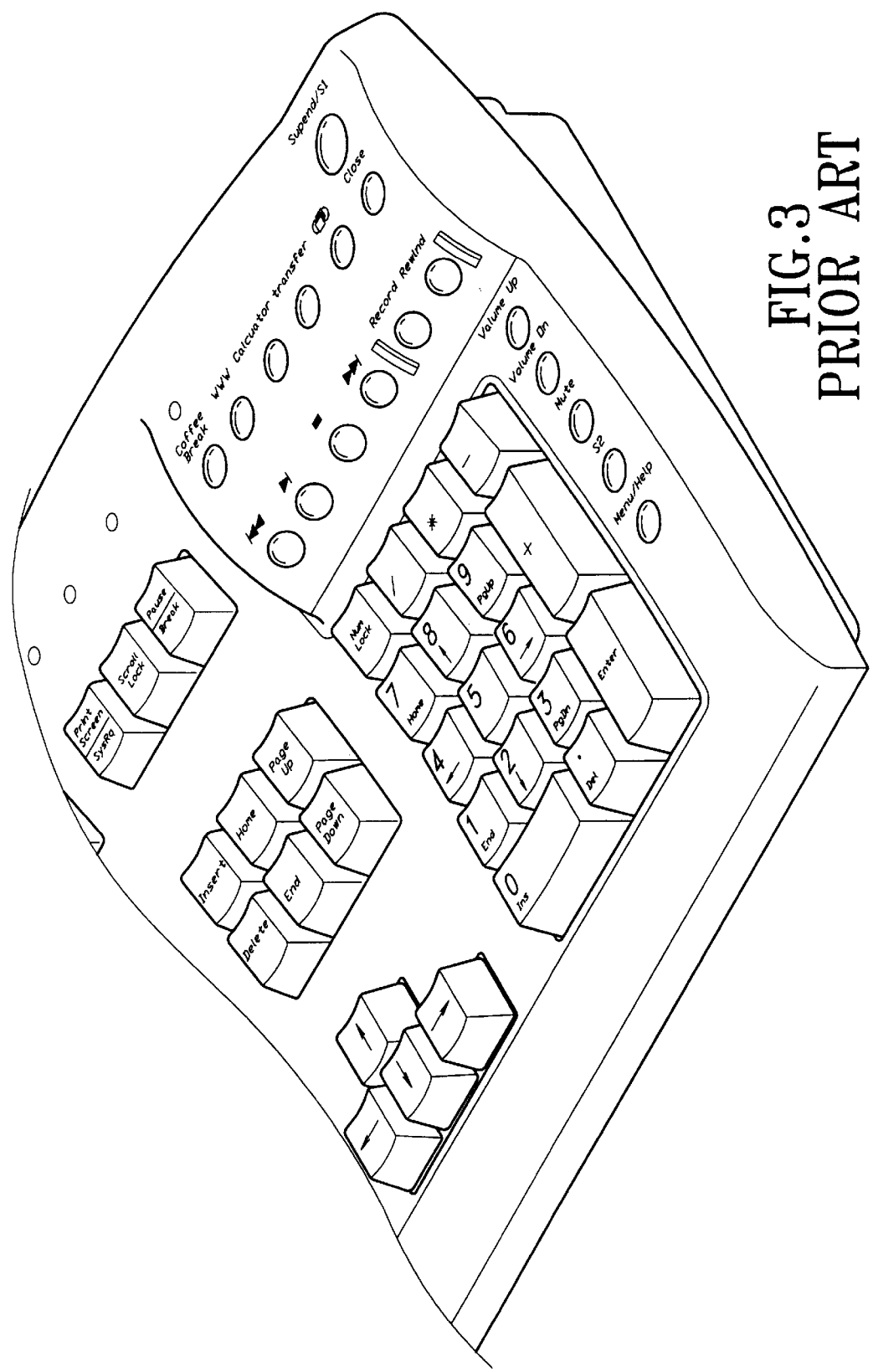
FIG. 3 shows a regular keyboard with added hot keys.
Figure 4:
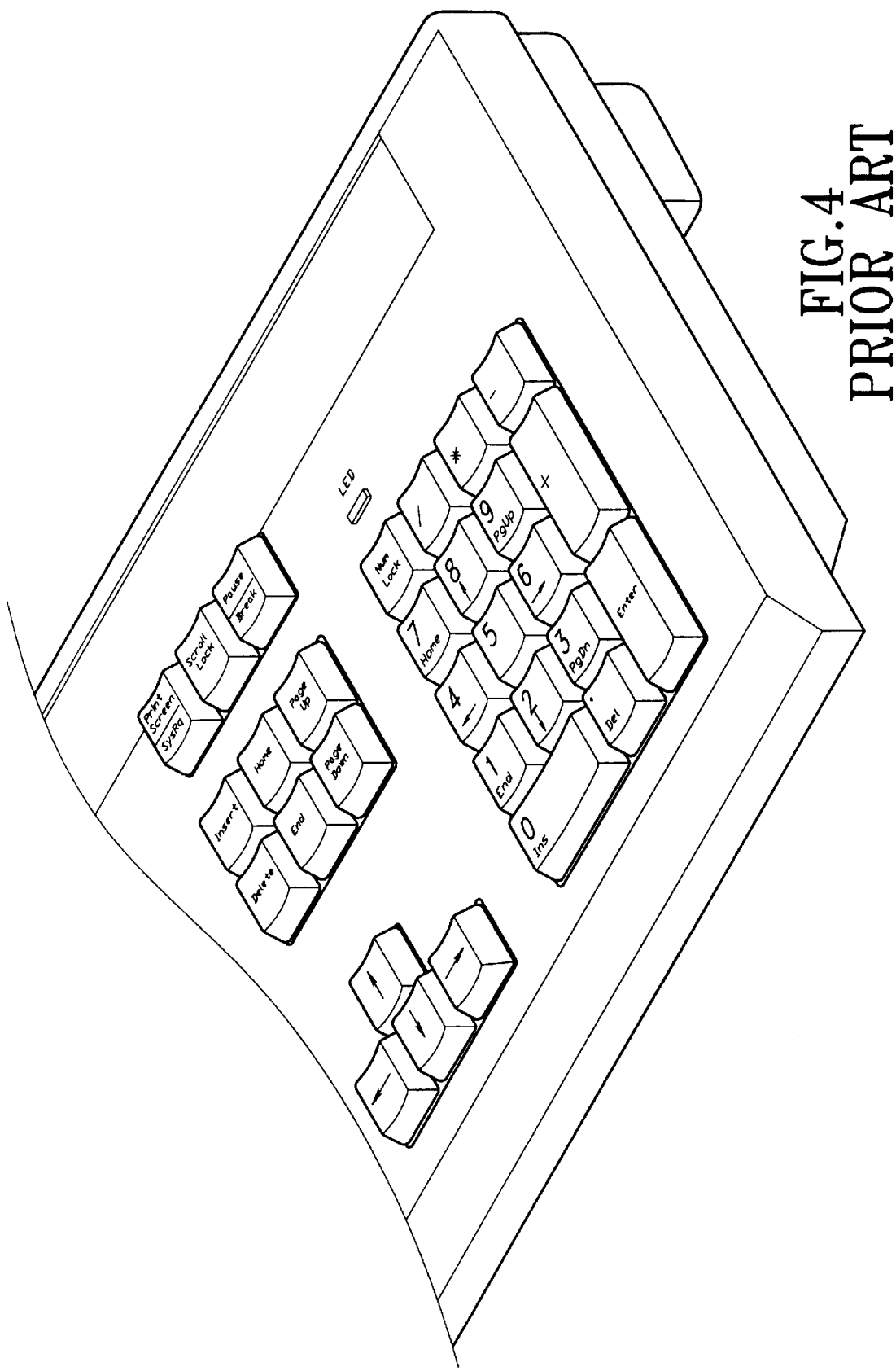
FIG. 4 shows the structure of a standard keyboard.

Referring to FIGS. 1 and 2, a keyboard 1 includes a control key pad 11 for controlling cursor, number, Num Lock, Scroll Lock (such as: Insert, Delete, Home, End, ↑, ↓, ←, →, Num Lock, Scroll Lock, etc.) or multimedia functions (such as Volume Up, Volume Dn, Mute, WWW, Record, Rewind, Close, Calculator, Transfer, S2, Suspend/S1, Menu/Help, Coffee Break, etc., about 20 keys) . The control key pad 11 is connected to a (8×16) scan matrix formed by I/O lines of the microprocessor of the internal circuit structure of the keyboard 1, and the scan code of Num Lock 12 or Scroll Lock 13 is adapted to match with the running of the application program of Win 95, so that the operation of the control key pad 11 can be monitored through the display screen. The design of the present invention enables the keyboard 1 to test the flag bit of Num Lock 12 or Scroll Lock 13 by using register of Win 95 directly, and to judge its flag bit through driver, so that the job of code converting can be executed, i.e., if the flag bit is tested as "1", the control key pad 11 is at the cursor, number control status; if the flag bit is tested as "0", the control key pad 11 is changed to Scan Code and set at the multimedia operation status. Thereafter, the function of WinExec O provided by Windows API is employed to the path of the file and the file index of the application program, thus the operator can directly operate the control key pad 11 of the keyboard 1 and monitor the operation through the display screen.

If the operator operates the function key "Player" (Hot Key) when the control key pad 11 is at the multimedia operation status, the application program of Windows system will scan the Scan Code of the function key "Player", and judge if the Scan Code is the Hot Key Code. If the Scan Code is judged as the Hot Key Code, the application program of Windows system immediately employs the function of WinExec O provided by Windows API to the path of the file of "Player" and the file index of the application program PLAYER.EXE (Bundle With Windows 95), thus "Player" is started and shown through the display screen. The other multimedia control keys are operated in the same manner.

It is to be understood that the drawings are designed for purposes of illustration only, and are not intended as a definition of the limits and scope of the invention disclosed.

I claim:

1. A multimedia keyboard structure for interfacing with an external processing device, said keyboard comprising:

a numeric key pad having a plurality of keys respectively representing multimedia functions, screen and cursor controls, and numerical values, said numeric key pad also having a Num Lock key;

a Scroll Lock key;

a microprocessor disposed internal to said keyboard;

a scan matrix formed by I/O lines of said microprocessor and connected to said numeric key pad and to said Scroll Lock key;

means for testing a flag bit of a WINDOWS-based operating system register to determine a value thereof, said flag bit value corresponding to an operational status of at least one of said Scroll Lock key and said Num Lock key, said microprocessor transferring key codes to the external processing device responsive to operation of said numeric key pad, said key codes representing respective numerical values or respective screen and cursor controls responsive to said flag bit value being set to a first value, and said key codes representing respective multimedia functions responsive to said flag bit being set to a second value.

* * * * *